United States Patent
Zlatar

(10) Patent No.: US 8,365,475 B2
(45) Date of Patent: Feb. 5, 2013

(54) READILY ADJUSTABLE AND LOCKABLE PEDESTAL FOR AN ACCESS FLOOR ASSEMBLY

(76) Inventor: Petar Zlatar, Seven Hills (AU)

( * ) Notice: Subject to any disclaimer, the term of this patent is extended or adjusted under 35 U.S.C. 154(b) by 0 days.

(21) Appl. No.: 13/264,831

(22) PCT Filed: Apr. 16, 2010

(86) PCT No.: PCT/AU2010/000418
§ 371 (c)(1),
(2), (4) Date: Dec. 19, 2011

(87) PCT Pub. No.: WO2010/118467
PCT Pub. Date: Oct. 21, 2010

(65) Prior Publication Data
US 2012/0073218 A1 Mar. 29, 2012

(30) Foreign Application Priority Data

Apr. 17, 2009 (AU) .................................. 2009901637

(51) Int. Cl.
*E04B 9/00* (2006.01)
(52) U.S. Cl. ...................... 52/126.6; 52/126.7; 52/169.9; 52/263; 52/127.12; 254/11; 254/13; 411/964; 248/188.4; 248/227.3
(58) Field of Classification Search .............. 52/126.6, 52/126.7, DIG. 11, 169.9, 126.5, 263, 127.12, 52/127.6, 220.1, 220.5; 248/122.1, 125.1, 248/188.4, 314, 227.3, 188.5, 222.11; 411/955, 411/964; 254/11, 13
See application file for complete search history.

(56) References Cited

U.S. PATENT DOCUMENTS

| | | | | | |
|---|---|---|---|---|---|
| 3,027,140 | A | * | 3/1962 | Holzbach | 254/98 |
| 3,222,030 | A | * | 12/1965 | Thorpe | 254/100 |
| 3,470,663 | A | | 10/1969 | Tate | |
| 3,616,584 | A | | 11/1971 | Sartori | |
| 4,085,557 | A | * | 4/1978 | Tharp | 52/263 |
| 4,279,109 | A | * | 7/1981 | Madl, Jr. | 52/263 |
| 4,637,181 | A | * | 1/1987 | Cohen | 52/126.5 |
| 5,791,096 | A | | 8/1998 | Chen | |
| 5,819,482 | A | * | 10/1998 | Belke et al. | 52/126.6 |
| 6,126,355 | A | * | 10/2000 | Clover, Jr. | 403/13 |
| 6,442,906 | B1 | * | 9/2002 | Hwang | 52/126.6 |
| 6,554,555 | B2 | * | 4/2003 | Imahigashi | 411/533 |
| 2005/0246984 | A1 | | 11/2005 | Colosimo | |

FOREIGN PATENT DOCUMENTS

| | | |
|---|---|---|
| CN | 2493691 | 5/2002 |
| JP | 09-273292 | 10/1997 |
| JP | 2008-106504 | 5/2008 |

* cited by examiner

Primary Examiner — Joshua J Michener
Assistant Examiner — Chi Q Nguyen
(74) Attorney, Agent, or Firm — Abelman, Frayne & Schwab

(57) ABSTRACT

A pedestal (18) for an access floor assembly (10), the pedestal (18) comprises a stand portion and a head portion. The stand portion has a base plate (21) for resting upon a sub-floor (20), and a stem (22) extending upwardly therefrom. The head portion has a platform (24) and a threaded shaft (26) extending downwardly therefrom. The pedestal (18) includes a lockable nut (28) which has a thread (29) adapted to screwably engage the threaded shaft (26), wherein the lockable nut (28) has at least one detent (30) to lock with the stem (22) in order to prevent the rotation of the lockable nut (28) when abutted against the stem (22).

6 Claims, 4 Drawing Sheets

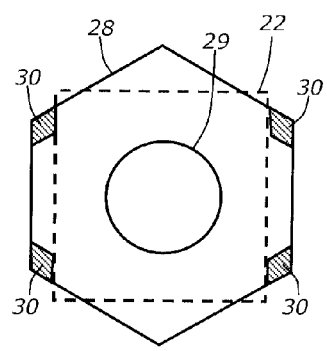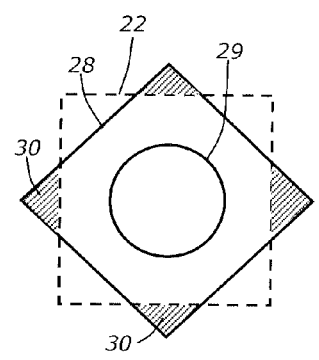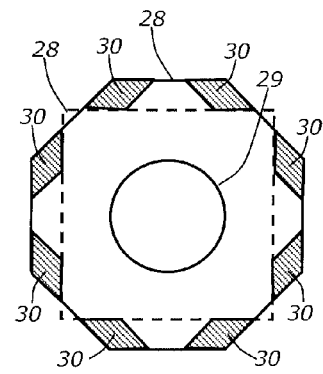
Fig.4   Fig.5   Fig.6
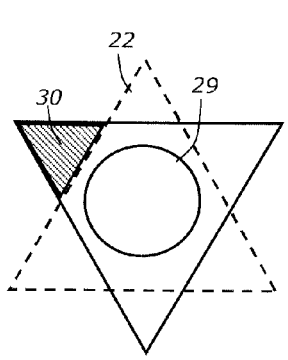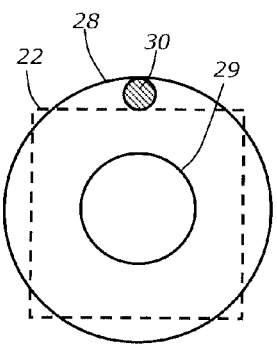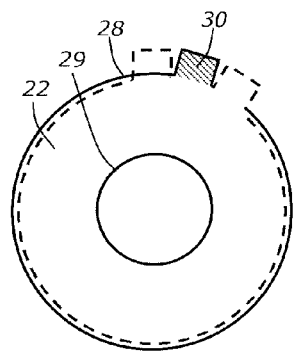
Fig.7   Fig.8   Fig.9
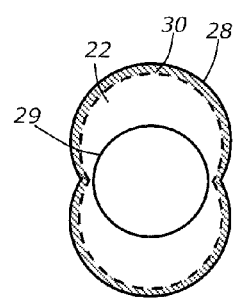
Fig.10

READILY ADJUSTABLE AND LOCKABLE PEDESTAL FOR AN ACCESS FLOOR ASSEMBLY

TECHNICAL FIELD

The present invention relates to access flooring and, in particular, to a readily adjustable and lockable pedestal for an access floor assembly.

BACKGROUND ART

Access flooring is a common feature of many computer, media and communication rooms. Being raised above a sub-floor by pedestals, access flooring provides underlying space to conceal and arrange cabling and other service items used to operate the computers or other interactive equipment located within the room. The interconnecting panels which define the surface of an access floor are designed to be readily taken up and rearranged, upon prior removal of any overlying carpet or other floor coverings, when upgrading of the computers and other interactive equipment is required.

However, a problem with prior art pedestals used in access floor assemblies is that height of the pedestals is not readily adjustable, making installation a time consuming process. Another problem with prior art pedestals is that movement across an access floor panel may gradually rotate the head portion of the pedestal and thereby raise or lower the level of the pedestal and the access floor panel supported by it. Yet another problem with prior art pedestals is that they are relatively expensive because they comprise numerous components which make manufacturing and assembling the pedestals a relatively time consuming process.

It is, therefore, an object of the present invention to overcome, or at least substantially ameliorate, the problems of prior art pedestals for access floors.

DISCLOSURE OF INVENTION

According to the present invention there is provided a pedestal for an access floor assembly, the pedestal comprising:
(a) a stand portion having
  (i) a base plate for resting upon a sub-floor, and
  (ii) a stem extending upwardly therefrom,
(b) a head portion having
  (i) a platform,
  (ii) a threaded shaft extending downwardly therefrom, and
(c) a lockable nut which has a thread adapted to screwably engage the threaded shaft, wherein the lockable nut has at least one detent to lock with the stem in order to prevent the rotation of the lockable nut when abutted against the stem.

The stem may have a square profile and the lockable nut may have four detents.

In a preferred embodiment of the invention, the platform of the head portion is adapted to engage a variety of gaskets and/or stringers.

According to another aspect of the present invention, there is provided a lockable nut for use in a pedestal for an access floor assembly, wherein the lockable nut is adapted to be locked in position on a threaded shaft of the pedestal when abutting a stem of the pedestal.

Preferably, the lockable nut is adapted to be locked by one or more detents which engage the stem of the pedestal.

According to another aspect of the present invention, there is provided an access floor assembly having a plurality of pedestals for supporting a plurality of floor panels over a sub floor and, wherein the one or more pedestals include a platform adapted to engage different gaskets.

Preferably, the platform of the pedestal is further adapted to engage stringers directly.

BRIEF DESCRIPTION OF THE DRAWINGS

FIG. 4 is a schematic top view of the square stem and hexagonal lockable nut shown in FIG. 3, FIG. 5 is a schematic top view of a square stem and square lockable nut, FIG. 6 is a schematic top view of another square stem and octagonal lockable nut, FIG. 7 is a schematic top view of a triangular stem and triangular lockable nut, FIG. 8 is a schematic top view of a square stem and circular lockable nut, FIG. 9 is a schematic top view of a circular stem and circular lockable nut, FIG. 10 is a schematic top view of an irregularly shaped stem and lockable nut.

BEST MODE FOR CARRYING OUT THE INVENTION

Figure 1:
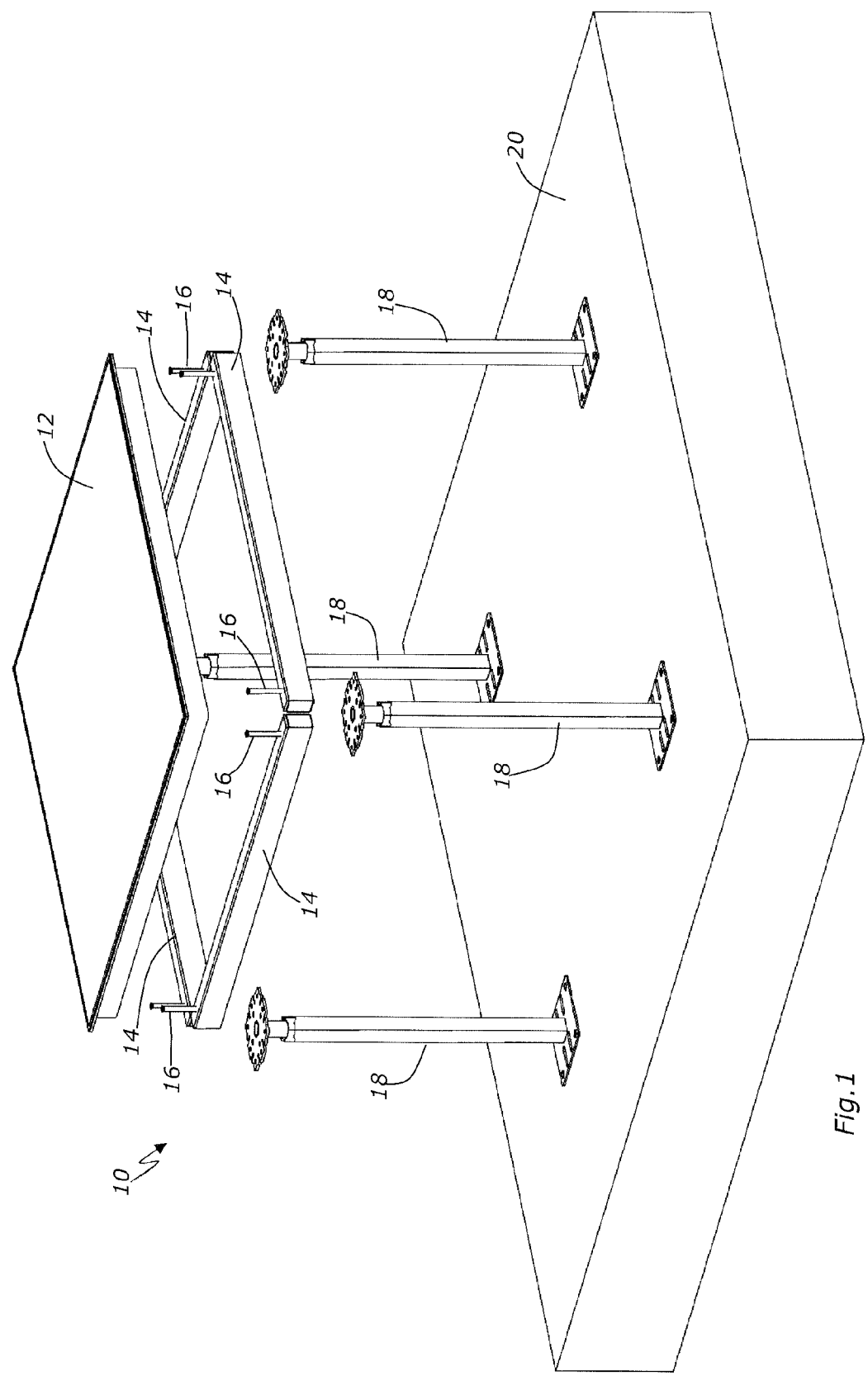
FIG. 1 is an exploded perspective view of an access floor assembly, incorporating a plurality of pedestals according to one embodiment of the present invention.

The access floor assembly 10 shown in FIG. 1 includes an access floor panel 12 which is supported by a plurality of stringers 14 which are connected using fasteners 16 to a plurality of pedestals 18. The pedestals 18 raise the access floor panel 12 above the sub-floor 20.

Figures 2, 3:
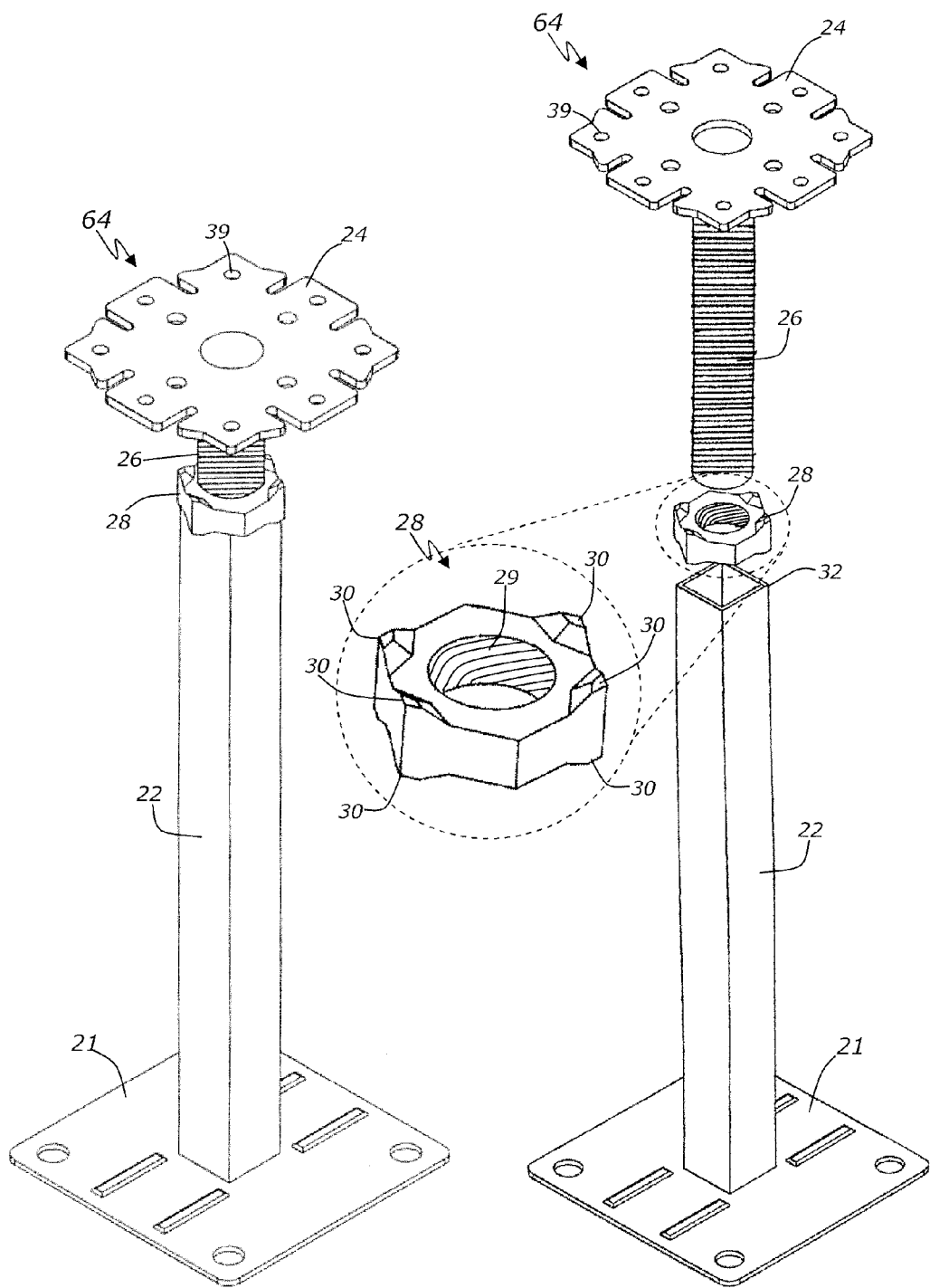
FIG. 2 is perspective view of one of the pedestals shown in FIG. 1.
FIG. 3 is an exploded perspective view of the pedestal shown in FIG. 2, together with an enlarged view of the lockable nut.
Figure 11:
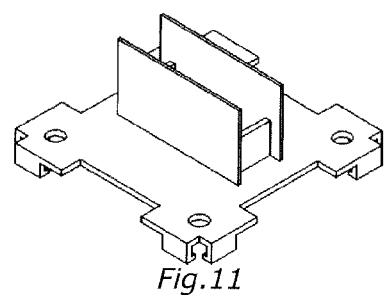
FIG. 11 is a perspective view of a gasket for use with the pedestal of FIG. 2.
Figure 12:
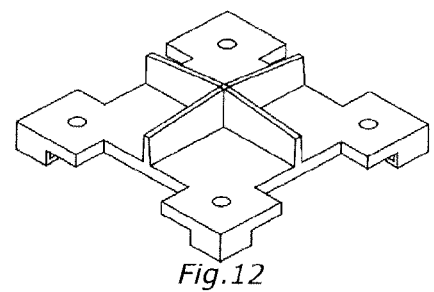
FIG. 12 is a perspective view of another gasket for use with the pedestal of FIG. 2.
Figure 13:
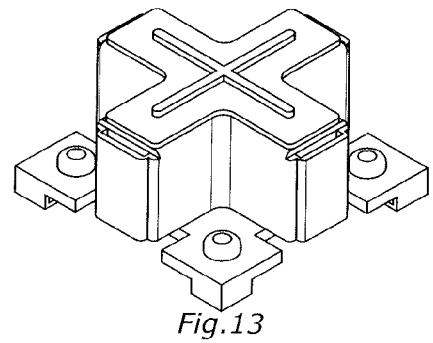
FIG. 13 is a perspective view of another gasket for use with the pedestal of FIG. 2.
Figure 14:
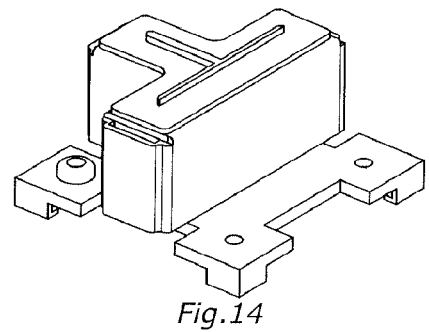
FIG. 14 is a perspective view of another gasket for use with the pedestal of FIG. 2.
Figure 15:
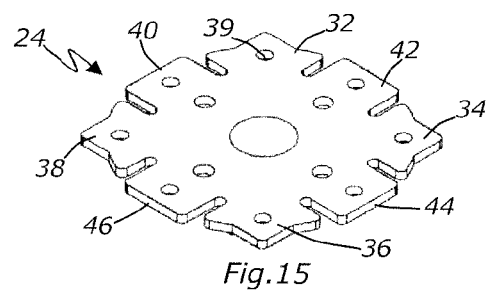
FIG. 15 is a perspective view of the platform of the pedestal of FIG. 2.

The pedestal 18 which is shown assembled in FIG. 2 and exploded in FIG. 3 comprises a stand portion and a head portion. The stand portion comprises a base plate 21 for resting upon the sub-floor 20, and a rectangular shaped metal stem 22 extending upwardly therefrom.

The head portion has a platform 24 and a threaded metal shaft 26 extending downwardly therefrom. The pedestal 10 also comprises a lockable nut 28 which has a threaded bore 29 adapted to engage the threaded metal shaft 26. The lockable nut 28 has a hexagon shape with detents 30 adapted to lock with stem 22 in order to prevent the rotation of the lockable nut 28 along the threaded shaft 26 when the lockable nut 28 is abutted against the stem.

The height of the pedestal 18 may be adjusted by raising the threaded shaft 26 out of the stem 22, adjusting the position of the lockable nut 28 along the threaded shaft 26 and then lowering the lockable nut 28 over the stem 22 and inserting the threaded shaft 26 into the stem 22. The pedestal 18 is therefore quickly and readily adjustable.

Various embodiments of the lockable nut 28 and the stem 22 are shown in FIGS. 4 to 10, the stem 22 (shown with unbroken lines) has a square profile, the lockable nut 28 (shown with dotted lines) has a hexagonal profile and four detents 30 (shown with hatched lines). In FIG. 5, the stem 22 has a square profile and the lockable nut 28 also has a square profile with four detents. In FIG. 6, the stem 22 has a square profile and the lockable nut 28 has an octagonal profile with eight detents. In FIG. 7, the stem 22 has a triangular profile and the lockable nut 28 also has a triangular profile with three detents. In FIG. 8, the stem 22 has a square profile and the lockable nut 28 has a circular profile with one detent. In FIG. 9, the stein 22 has a circular profile with two spokes adapted to trap the detent 30 on the lockable nut 28 which also has a circular profile. In FIG. 10, the stem 22 has an irregular sided profile which may be encompassed by a lockable nut 28 which is hollow and also has a larger profile of the same shape which acts as a detent 30.

The pedestal 18 is sturdy and able to sustain a significant amount of weight. It is preferred for use with access floors which support a great deal of weight and are infrequently used by pedestrians (who prefer a less rigid floor), such as computer rooms containing many server racks and cabinets. The present invention has less working components than prior art pedestals and is therefore quicker to manufacture and assemble and is thereby cheaper to produce than prior art pedestals.

The platform 24 of the pedestal 18 (see FIG. 2) is adapted to be attached to a variety of different gaskets, as shown in FIGS. 11 to 14. These different gaskets allow different configurations or types of access floor panels 12 to be utilised, thereby providing flexibility during the installation phase. The flanges 32, 34, 36 and 38 at the corners of the platform 24 are tapered so as to fit the corners of the gaskets. The gaskets may be secured to the platform 24 via fasteners 16 which are placed through holes 39 in the platform 24. The platform 24 can also be secured to the stringers 14 along the longitudinal flanges 40, 42, 44 and 46, as shown in FIG. 1.

Various modifications may be made in details of design and construction without departing from the scope and ambit of the invention.

INDUSTRIAL APPLICABILITY

The present invention has an industrial application in the construction industry for commercial, industrial and office building environments which require access floors for particular applications.

The invention claimed is:

1. A pedestal system for an access floor assembly, the pedestal comprising:
    a) a stand portion having
        i. a base plate for resting upon a sub-floor, and
        ii. a stem extending upwardly therefrom and having a square profile so as to define four side surfaces of the stem,
    b) a head portion having
        i. a platform, and
        ii. a threaded shaft extending downwardly therefrom, and
    c) a lockable nut having a hexagon shape and which has a thread adapted to screwably engage the threaded shaft, wherein the lockable nut has four detents to lock with the stem in order to prevent the rotation of the lockable nut along the threaded shaft when abutted against the stem, and wherein a first pair of the detents extend downwardly from a respective first pair of adjacent corners which define therebetween a first side surface of the lockable nut and a second pair of the detents extend downwardly from a respective second pair of adjacent corners which define therebetween a second side surface of the lockable nut which is opposite the first side surface of the lockable nut,
    and wherein the four detents individually lock with the four side surfaces of the stein by a first detent of the first pair of detents abutting against a first side surface of the stein, a second detent of the first pair of detents abutting against a second side surface of the stein which is adjacent the first side surface of the stein, a third detent of the second pair of detents abutting against a third side surface of the stein which is opposite the first side surface of the stein, and a fourth detent of the second pair of detents abutting against a fourth side surface of the stein which is opposite the second side surface of the stein.

2. The pedestal system of claim 1, wherein the platform of the head portion has means for connecting the platform to different gaskets.

3. The pedestal system of claim 2, wherein the platform is connectable with one or more stringers which extend from one platform of the pedestal to another pedestal.

4. An access floor assembly, comprising a plurality of floor panels; and a plurality of pedestals for supporting the plurality of floor panels over a sub floor, each pedestal having:
    a) a stand portion having
        i. a base plate for resting upon a sub-floor, and
        ii. a stem extending upwardly therefrom and having a square profile so as to define four side surfaces of the stem,
    b) a head portion having
        i. a platform, and
        ii. a threaded shaft extending downwardly therefrom, and
    c) a lockable nut having a hexagon shape and which has a thread adapted to screwably engage the threaded shaft, wherein the lockable nut has four detents to lock with the stem in order to prevent the rotation of the lockable nut along the threaded shaft when abutted against the stem, and wherein a first pair of the detents extend downwardly from a respective first pair of adjacent corners which define therebetween a first side surface of the lockable nut and a second pair of the detents extend downwardly from a respective second pair of adjacent corners which define therebetween a second side surface of the lockable nut which is opposite the first side surface of the lockable nut,
    and wherein the four detents individually lock with the four side surfaces of the stein by a first detent of the first pair of detents abutting against a first side surface of the stein, a second detent of the first pair of detents abutting against a second side surface of the stein which is adjacent the first side surface of the stein, a third detent of the second pair of detents abutting against a third side surface of the stein which is opposite the first side surface of the stein, and a fourth detent of the second pair of detents abutting against a fourth side surface of the stein which is opposite the second side surface of the stein.

5. The access floor assembly of claim 4, wherein the platform of each pedestal has means for engaging different gaskets.

6. The access floor assembly of claim 5, wherein the pedestal is directly engageable with at least one stringer which extends from one platform of the pedestal to another pedestal.

* * * * *

UNITED STATES PATENT AND TRADEMARK OFFICE
CERTIFICATE OF CORRECTION

PATENT NO. : 8,365,475 B2  Page 1 of 1
APPLICATION NO. : 13/264831
DATED : February 5, 2013
INVENTOR(S) : Peter Zlatar It is certified that error appears in the above-identified patent and that said Letters Patent is hereby corrected as shown below:

In the Claims:

In claim 1 at column 4, line 8, "stein" should read -- stem --,
line 10, "stein" should read -- stem --,
line 11, "stein" should read -- stem --,
line 12, "stein" should read -- stem --,
line 14, "stein" should read -- stem --,
line 15, "stein" should read -- stem --,
line 17, "stein" should read -- stem --,
line 18, "stein" should read -- stem --, In claim 4 at column 4, line 51, "stein" should read -- stem --,
line 53, "stein" should read -- stem --,
line 54, "stein" should read -- stem --,
line 55, "stein" should read -- stem --,
line 57, "stein" should read -- stem --,
line 58, "stein" should read -- stem --,
line 60, "stein" should read -- stem --,
line 61, "stein" should read -- stem --, Signed and Sealed this
Second Day of July, 2013

Teresa Stanek Rea
*Acting Director of the United States Patent and Trademark Office*